Sept. 18, 1962     W. S. PRAEG     3,054,225

GEAR HONING MACHINE

Filed Sept. 14, 1959

*INVENTOR.*
WALTER S. PRAEG
BY *Whittemore,*
*Hulbert & Belknap*
ATTORNEYS

United States Patent Office 3,054,225
Patented Sept. 18, 1962

3,054,225
GEAR HONING MACHINE
Walter S. Praeg, Detroit, Mich., assignor to National Broach & Machine Company, Detroit, Mich., a corporation of Michigan
Filed Sept. 14, 1959, Ser. No. 839,690
9 Claims. (Cl. 51—52)

The present invention relates to a gear honing machine, and more particularly to a gear honing machine adapted to provide incremental axial adjustment of the honing tool.

In gear honing a gear-like honing tool is employed the toothed portion of which is a hard but slightly yieldable and highly resilient compound having abrasive particles embedded therein. The teeth of the honing tool are conjugate to the teeth of a work gear and its helix angle is selected such that the hone and gear operate in mesh with their axes crossed at a limited angle. Either the gear or home is rotated positively and drives the other of the two members through their meshed engagement.

The operation is particularly useful for honing gears after heat treatment to remove nicks and minor imperfections as well as to effect some improvement of the tooth form.

Accordingly, it is essential that operating pressure be provided between the engaged tooth surfaces. This may be accomplished by opposing rotation of the driven member or by maintaining the gear and tool in tight mesh by maintaining radial pressure therebetween, or by meshing them under predetermined radial pressure and thereafter locking them against radial separation.

Although the honing tool exhibits extremely long life, it is nevertheless an abrasive tool and as such undergoes some wear or erosion in use. This is particularly true since it is recalled that the work gear is a hardened steel gear and that the operation involves removal of nicks and burrs.

Due to the fact that the gear and hone operate in mesh with their axes crossed in space, it will be apparent that tooth contact between gear teeth and hone teeth of uniform cross-section is theoretical point contact. Actually of course, the contact takes place over a limited area. As the gear and hone rotate in mesh the theoretical point of contact moves diagonally between the crest and root of the teeth. This tends to produce a theoretical line and in practice a narrow band of contact, and would result in failure to finish the teeth of the work gear from end to end. In order to insure uniform finishing action from end to end of the gear teeth a relative reciprocation is introduced between the gear and hone in a direction parallel to the axis of the gear.

By the same considerations only a narrow zone of the honing tool initially comes into operation. However, since the honing tool is subject to wear or erosion, this band of contact widens out after a few gears have been honed and produces hone teeth having longitudinal hollows therein. The hollowed or concave portions of these hone teeth have contact with the corresponding zones of the teeth of the work gear and may be said to "envelop" the teeth of the work gear or portions thereof. Obviously, as the teeth of the hone become worn so as to develop broad bands of contact and to envelop corresponding broad bands of the teeth of the work gears, the pressure operating conditions change. Thus for example, when the teeth of the hone are worn so as to have a band of contact twice as wide as a partially worn hone, a predetermined pressure applied radially between the gear and the hone results in a unit pressure only half as great as that which existed when the band of contact was relatively narrow.

Obviously, better control and more uniform operating conditions can be maintained if the band of contact between the teeth of the hone and gear remains uniform.

It is accordingly an object of the present invention to provide a gear honing machine including mechanism effective to eliminate localized wear on portions of the hone teeth.

More specifically, it is an object of the present invention to provide a gear honing machine which includes means for effecting a very slight incremental axial adjustment of the hone periodically during the operation of finishing a plurality of gears.

More specifically, it is an object of the present invention to provide a gear honing machine in which relative reciprocation or traverse is provided between the gear and hone in the direction of the gear axis, which comprises means responsive to a predetermined number of strokes of traverse to effect a first series of incremental adjustments of the hone in a first direction parallel to its axis, followed by a like series of adjustments in the opposite direction.

Other objects and features of the invention will become apparent as the description proceeds, especially when taken in conjunction with the accompanying drawing, illustrating a preferred embodiment of the invention, wherein.

Figure 1:
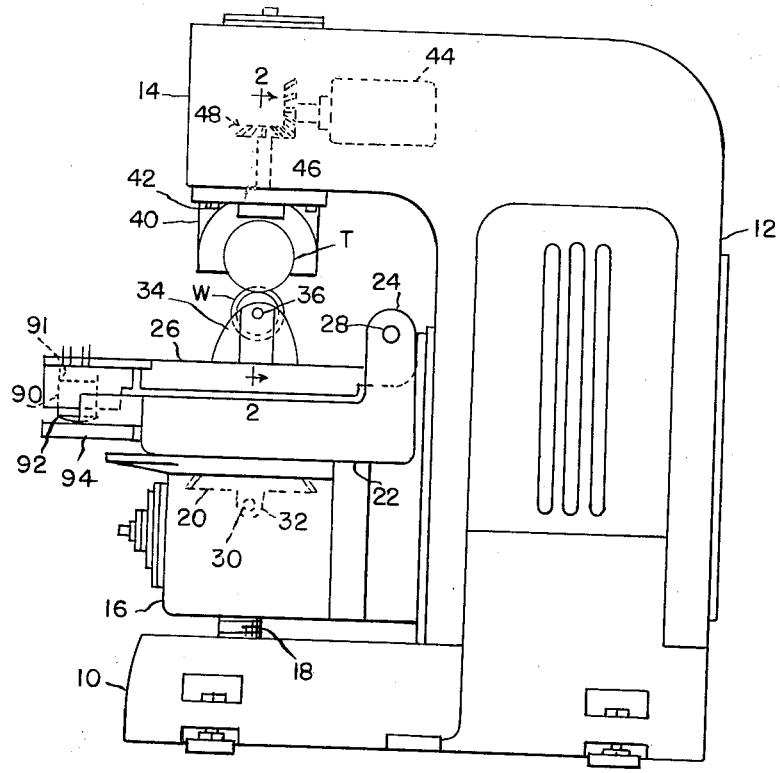
FIGURE 1 is a side elevation of a gear honing machine incorporating the present invention.

The gear honing machine illustrated in FIGURE 1 comprises a frame or base including a foot portion 10, a column 12, and an overhanging arm 14. Mounted for vertical adjustment on the front surface of the column 12 is a knee 16, this adjustment being effected by a feed screw and nut combination, a portion of the screw being shown at 18. Mounted on the upper surface of the knee for horizontal reciprocation in ways indicated diagrammatically at 20 is a slide 22 having upstanding posts 24 to which is pivoted a table 26, the pivot connection being illustrated at 28.

Power means are provided for reciprocating the slide 22, this means including a feed screw 30 and a nut 32.

Mounted on the table 26 are a pair of work supporting heads one of which is illustrated at 34, and which includes a rotary spindle indicated at 36 for supporting a work gear W. It will be observed in this figure that the axis of the spindle 36 is horizontal and extends in parallelism with the ways 20.

Carried at the underside of the arm 14 is a tool or hone head 40 which is mounted for angular adjustment about a vertical axis by suitable means (not shown) and is adapted to be locked in adjusted position by suitable means such as screws 42 received in T-slots provided in the underside of the arm 14. Located within the arm 14 is a motor 44 adapted to drive a vertical shaft 46 through bevel gearing indicated at 48.

Figure 2:
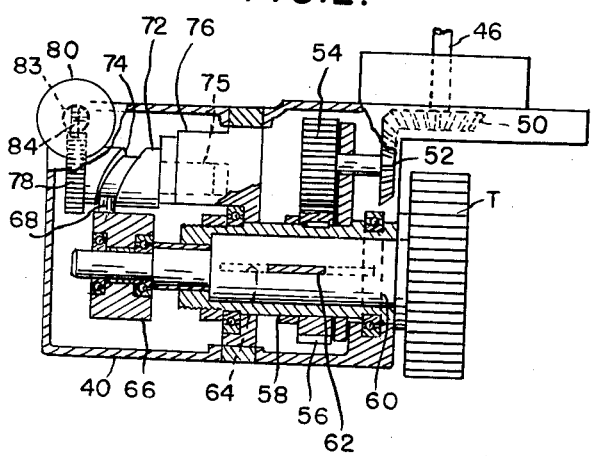
FIGURE 2 is an enlarged fragmentary sectional view of the hone head taken on the line 2—2, FIGURE 1.

Referring now to FIGURE 2 the vertical shaft 46 is indicated and the tool head 40 is shown in section. At its lower end the shaft 46 carries a bevel gear 50 which meshes with a bevel gear 52 connected to a gear 54. The gear 54 in turn meshes with a gear 56 keyed or otherwise secured to a tubular shaft 58 journaled for rotation within the tool head 50.

Longitudinally slidable within the tubular shaft 58 is a tool spindle 60 carrying the gear honing tool T. The spindle 60 is provided with drive means herein diagrammatically illustrated as a key 62 and slot 64 so that rotation imparted to the tubular shaft 58 is transmitted to the spindle 60 and the tool T.

Figure 3:
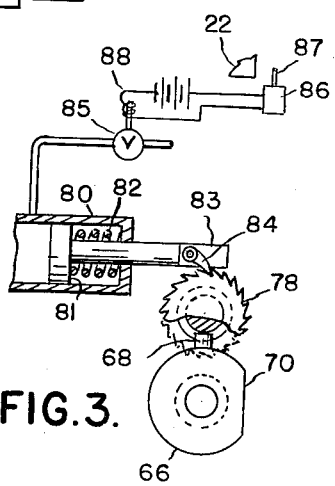
FIGURE 3 is a diagrammatic view illustrating the pawl and ratchet feed.

At its left hand end, as seen in FIGURE 2, the spindle 60 is reduced and is rotatably received in a bearing block 66 having a drive pin 68 extending upwardly therefrom. As best seen in FIGURE 3, the bearing block 66 has a flat side as indicated at 70 engageable by a corresponding flat side at the inside of the tool head 40 so as to prevent rotation of the bearing block 66.

Associated with the bearing block 66 is a cam 72 having a cam slot 74 therein. The cam slot extends completely around the cam 72 at an angle and is continuous so that a complete rotation of the cam 72 will result in first a movement of the bearing block 66 to the right, followed by a return movement of the bearing block to the left. As illustrated in FIGURE 2, the cam 72 has a laterally projecting shaft portion 75 received within a bushing 76 provided in the hone head which mounts the cam for rotation.

Carried by the cam at one end thereof is a ratchet plate 78 and associated with the ratchet plate is pawl mechanism including a cylinder 80 in which a piston 81 is movable against a compression spring 82. Connected to the piston 81 is a piston rod 83 projecting beyond a closed end of the piston. The pawl 84 is pivoted to the piston rod in position to engage the teeth of the ratchet plate 78. A solenoid actuated three-way valve 85 is provided to admit fluid under pressure to the cylinder to move the piston 81 against the spring 82. The solenoid is herein illustrated as controlled by a switch 86 having a switch arm 87 engageable by a portion of the slide 22 as it reaches one end of its traverse stroke. When the solenoid, whose winding is shown at 88, is de-energized the valve 85 releases the fluid under pressure in the cylinder 80 and the spring returns the piston to its starting position. Suitable abutments (not shown) may be provided to limit and preferably adjust the stroke of the piston so as to pick up one or more ratchet teeth at each stroke.

A cycle of the gear honing machine comprises loading a work gear on or connected to the rotary work supporting spindle 36 with its teeth in mesh with the teeth of the honing tool T. In the particular form of honing machine illustrated in FIGURE 1, the hone and gear are maintained or adjusted under a controlled radial pressure by mechanism including a piston 90 movable in a cylinder 91 and having a portion 92 engageable with a platform 94. Pressure admitted to the cylinder moves the piston 90 downwardly and the reaction in the cylinder moves the pivoted table 26 upwardly about the axis of its pivot support 28. A motor connected to the feed screw 30 is now energized in forward and reverse directions to cause at least one complete reciprocation of the slide 22 in the ways 20. At the same time, the motor 44 is energized to effect relative rapid rotation of the honing tool T. In some cases a plurality of reciprocations may be provided and if necessary additional upward feeding movement of the table 26 may be provided between reciprocations. Alternatively, pressure may be maintained on the piston 90 so that as material is removed from the gear the table 26 is allowed to move upwardly to maintain constant pressure.

In accordance with the present invention, in order to prevent localized wear on the hone, the ratchet plate 78 is actuated periodically to effect a very small axial adjustment of the hone. It is desirable that this adjustment of the hone shall take place at the end of a stroke of traverse of the slide 22, and accordingly, the most convenient control of the pawl and ratchet hone feed mechanism is by the switch 86 positioned to be actuated by the slide 22 at one end of its traverse stroke as previously described.

In a practical embodiment of the present machine a ratchet plate having 40 notches was provided so that after a series of 40 gears had been completed the hone would have been advanced incrementally 20 times in one direction and then retracted 20 times in the opposite direction. The total travel imparted to the hone is of course a function of the transverse width of the hone but is intended to be sufficient to cause substantially the entire width of the hone to be active in finishing surfaces of the teeth of a series of gears.

Since the honing operation on each gear is carried out with a slightly different tool setting, any tendency for a series of gears to wear hollows or enveloping concave portions in the surfaces of the hone teeth is effectively avoided. More important, by shifting the hone slightly between each gear finishing operation, the teeth of the hone are maintained in substantially uniform condition from end to end so that the actual contact between toothed surfaces of the hone and of the gear remain relatively small areas. With such relatively small areas of contact, a correspondingly light pressure between the teeth of the hone and gear may be employed.

An additional advantage flowing from the fact that the areas of contact between the teeth are relatively small is that when a nick or burr is encountered on the teeth of the gear its removal is facilitated by the concentrated action of the small zones of the honing teeth which successively come into contact therewith.

An additional advantage of the present machine peculiar to its operation in conjunction with hones is that the incremental shifting of the zone of operation of the hone following each work gear tends to maintain the surface of the hone in sharp, effective cutting condition and seems to prevent the tendency to glaze and become less efficient abrading tools which is found when the teeth of the hone become longitudinally concave and hence envelop substantial lengths of work gear teeth.

The drawing and the foregoing specification constitute a description of the improved gear honing machine in such full, clear, concise and exact terms as to enable any person skilled in the art to practice the invention, the scope of which is indicated by the appended claims.

What I claim as my invention is:

1. A gear honing machine for use with a gear-like honing tool having its tooth portions formed of an abrasive containing resin compound, said machine comprising a base, a rotary work support and a rotary tool support mounted on said base in position to support a work gear and tool in mesh with each other at crossed axes, means mounting one of said supports for angular adjustment about an axis perpendicular to and intersecting the axes of both rotary supports, means mounting one of said supports for rectilinear reciprocation in a direction parallel to the axis of said rotary work support, means for driving one of said rotary supports in rotation, the other of said supports being substantially freely rotatable, means for adjusting one of said supports toward and away from the other of said supports, means mounting one of said supports for adjustment in a direction parallel to the axis of said tool support, cam means interposed between said base and said last named support to effect the adjustment thereof, and tool set means operated automatically as a result of reciprocation of the support movable parallel to the axis of the work support to effect a single very small adjustment of one of said supports in a direction parallel to the axis of said tool support, said tool set means comprising means to effect a series of intermittent very small adjustments of one of said supports in a first direction parallel to the axis of said tool support and thereafter to effect a like series of adjustments in the opposite direction, cam means comprising a rotary cam on said base to produce a series of movements of the associated support first in one direction and thereafter in the opposite direction upon a complete rotation of said cam, a cam follower on said associated support, means to effect intermittent rotation of said cam in timed relation to reciprocation of the support movable parallel to the axis of said work support, said last recited means comprising a pawl and ratchet mechanism, and means for reciprocating the pawl of said mechanism parallel to the axis of said work support.

2. A gear finishing machine comprising a base, a tool head mounted for angular adjustment on said base, a rotary tool spindle mounted on said tool head for rotation about an axis perpendicular to and intersecting the axis of angular adjustment of said head, a first slide movable on said base toward and away from said tool head, a second slide movable on said first slide for back and forth reciprocation, a substantially freely rotatable work spindle mounted on said second slide with its axis parallel to the direction of reciprocation of said second slide, rotary drive means connected to said tool spindle, traverse mechanism connected to said first slide to effect slow back and forth reciprocation thereof, means mounting said tool spindle for axial adjustment in said tool head, and tool set means connected to said tool spindle and operated automatically by reciprocation of said first slide to effect a series of slight incremental axial adjustments of said tool spindle in the same direction followed by a like series of adjustments in the opposite direction, said tool set means comprising a cam and cam follower disposed between said tool head and tool spindle, a ratchet connected to said cam, a pawl cooperating with said ratchet and actuated by a stroke of traverse of said first slide.

3. The method of honing hardened steel gears with a honing gear having its tooth portions formed of an abrasive containing resin compound and adapted to have its teeth undergo substantial wear into a longitudinally hollow form to conform with the teeth of the work gears, which comprises rotating a series of work gears in mesh at crossed axes at honing speeds with the honing gear by rotating one of said gears directly and the other of said gears by the meshed engagement therebetween, maintaining said gears in pressure engagement during such rotation, providing a slow relative reciprocation between said gears in a direction substantially parallel to the axis of said work gear to distribute the action of said hone gear from end to end of the teeth of said work gear, and providing second relative movement between said gears in a direction substantially parallel to the axis of said hone gear to spread the contact between the teeth of said gears longitudinally toward the ends of the teeth of said hone gear, said second relative movement being timed to require the finishing of a plurality of work gears to result in completion of said second relative movement in one direction.

4. The method of claim 3 in which said second relative movement is the result of an incremental movement of said hone gear parallel to its axis.

5. The method of claim 4 in which said second relative movement takes place at the end of a traverse stroke of said reciprocation.

6. Gear finishing apparatus comprising a gear-like honing tool having its tooth portions formed of an abrasive containing resin compound adapted to undergo considerable wear when run in mesh with a series of hardened steel work gears, a base, a rotary work support and a rotary tool support mounted on said base in position to support each of a series of work gears in mesh with the honing tool at crossed axes, means mounting one of said supports for angular adjustment about an axis perpendicular to and intersecting the axes of both rotary supports, means mounting one of said supports for rectilinear reciprocation in a direction parallel to the axis of said rotary work support, means for driving one of said supports in rotation, the other of said supports being substantially freely rotatable, means for adjusting one of said supports toward and away from the other of said supports, and tool set means connected to one of said supports to effect intermittent very small adjustments of one of said supports in a direction parallel to the axis of said tool support, and means operated automatically in response to reciprocation of the reciprocating support to actuate said tool set means.

7. Apparatus as defined in claim 6 in which said tool set means comprises means to effect a series of intermittent very small adjustments of one of said supports in a first direction parallel to the axis of said tool support and thereafter to effect a like series of adjustments in the opposite direction.

8. Gear finishing apparatus comprising a honing gear the tooth portions of which are formed of a resin compound having abrasive particles embedded therein and adapted to undergo considerable wear when run in mesh with a series of hardened steel work gears, a rotatable support for said honing gear, a rotatable support for work gears, a frame, means mounting said supports on said frame in position to cause the honing gear to mesh with a work gear with their axes crossed, means for driving one of said supports in rotation, and means for effecting relative movement between said supports in a direction parallel to a plane parallel to the axes of both of said supports to provide for honing contact from end to end of the teeth of the work gears to finish such teeth uniformly and in addition to provide for honing contact to be distributed longitudinally of the teeth of the honing gear to prevent development of a hollow in the mid-portions of the teeth of the honing gear.

9. The method of honing hardened steel gears with a honing gear having its tooth portions formed of an abrasive containing resin compound and adapted to have its teeth undergo substantial wear into a longitudinally hollow form to conform with the teeth of the work gears, which comprises rotating a series of work gears in mesh at crossed axes at honing speeds with the honing gear by rotating one of said gears directly and the other of said gears by the meshed engagement therebetween, maintaining said gears in pressure engagement during such rotation, providing a slow relative reciprocation between said gears having a component of movement in a direction substantially parallel to the axis of said work gear to distribute the action of said honing gear from end to end of the teeth of said work gear, and providing a second relative component of movement between said gears in a direction substantially parallel to the axis of said honing gear to spread the contact between the teeth of said gears longitudinally toward the ends of the teeth of said honing gear.

References Cited in the file of this patent

UNITED STATES PATENTS

| | | |
|---|---|---|
| 1,989,651 | Drummond | Jan. 29, 1935 |
| 2,165,898 | Mathewson | July 11, 1939 |
| 2,542,569 | Praeg | Feb. 20, 1951 |
| 2,612,080 | Davis | Sept. 30, 1952 |
| 2,627,141 | Praeg | Feb. 3, 1953 |
| 2,690,701 | Zimmerman | Oct. 5, 1954 |